(12) United States Patent
Gódor et al.

(10) Patent No.: US 11,200,524 B2
(45) Date of Patent: Dec. 14, 2021

(54) TECHNIQUE FOR UTILITY NETWORK MANAGEMENT

(71) Applicant: Telefonaktiebolaget LM Ericsson (publ), Stockholm (SE)

(72) Inventors: István Gódor, Budapest (HU); Péter Hága, Budapest (HU); Zsófia Kallus, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 10 days.

(21) Appl. No.: 16/766,885

(22) PCT Filed: Nov. 30, 2017

(86) PCT No.: PCT/EP2017/081036
§ 371 (c)(1),
(2) Date: May 26, 2020

(87) PCT Pub. No.: WO2019/105561
PCT Pub. Date: Jun. 6, 2019

(65) Prior Publication Data
US 2021/0304099 A1    Sep. 30, 2021

(51) Int. Cl.
*G06Q 10/06* (2012.01)
*G06Q 10/08* (2012.01)
*G06Q 50/06* (2012.01)

(52) U.S. Cl.
CPC .......... *G06Q 10/06315* (2013.01); *G06Q 10/063114* (2013.01); *G06Q 10/08* (2013.01); *G06Q 50/06* (2013.01)

(58) Field of Classification Search
CPC ..... G06Q 10/06315; G06Q 10/063114; G06Q 10/08; G06Q 50/06
See application file for complete search history.

(56) References Cited

U.S. PATENT DOCUMENTS 6,477,143 B1* 11/2002 Ginossar .............. H04L 47/10
                                                  370/230
2005/0132051 A1* 6/2005 Hill ..................... H04L 41/147
                                                  709/226
(Continued)

FOREIGN PATENT DOCUMENTS

EP    2899674 A1    7/2015

OTHER PUBLICATIONS

Kondor, Dániel, et al., "Visualizing signatures of human activity in cities across the globe", SENSEable City Laboratory, Massachusetts Institute of Technology, Cambridge, MA, USA; Ericsson Research, Budapest, Hungary; Ericsson Research, Sweden , Sep. 1, 2015, pp. 1-6 (Year: 2015).*

(Continued)

*Primary Examiner* — Zeina Elchanti
(74) *Attorney, Agent, or Firm* — Murphy, Bilak & Homiller, PLLC

(57) ABSTRACT

A computer system and computer-automated method for analyzing performance data in a utility network, such as electricity, gas or water supply, are described. A data set is provided that contains a log of a first time sequence of network events which are classified into event types. A second time sequence is generated from the first time sequence by aggregating the events into event groups, and at least a third time sequence is generated by aggregating the event groups into event super-groups. A multi-level time sequence event hierarchy is thus created. The multiple time-sequence levels are rendered into a visualization in which the different event types are visually distinct from each other. The visualization reveals to a domain expert patterns of behavior in the data set which can be used to detect current network problems and to predict future network supply and consumption, for example in a utility network operations center.

18 Claims, 7 Drawing Sheets

(56) References Cited

U.S. PATENT DOCUMENTS

| | | | | |
|---|---|---|---|---|
| 2009/0312031 | A1* | 12/2009 | Harris | H04L 47/823 |
| | | | | 455/453 |
| 2015/0309547 | A1* | 10/2015 | Huang | H02J 7/0063 |
| | | | | 307/80 |
| 2016/0119739 | A1* | 4/2016 | Hampel | H04W 4/38 |
| | | | | 370/315 |
| 2016/0156188 | A1* | 6/2016 | Baba | G05B 15/02 |
| | | | | 700/296 |
| 2016/0196622 | A1* | 7/2016 | Tokunaga | G06Q 30/06 |
| | | | | 705/7.25 |
| 2017/0366628 | A1* | 12/2017 | Devkar | H04L 67/306 |

OTHER PUBLICATIONS

Grauwin, Sébastian, et al., "Towards a comparative science of cities: using mobile traffic records in New York, London and Hong Kong", ResearchGate, Jun. 2014, pp. 1-25.

Kondor, Dániel, et al., "Visualizing signatures of human activity in cities across the globe", SENSEable City Laboratory, Massachusetts Institute of Technology, Cambridge, MA, USA; Ericsson Research, Budapest, Hungary Ericsson Research, Sweden, Sep. 1, 2015, pp. 1-6.

Maheshwari, Ketan, et al., "Toward a reliable, secure and fault tolerant smart grid state estimation in the cloud", IEEE, 2013, pp. 1-6.

Unknown, Author, "The Digital Signatures of Sport", Ericsson Mobility Report, Jun. 2015, pp. 1-4.

Unknown, Author, "The Signatures of City Life", Ericsson Mobility Report, Nov. 2014, pp. 1-2.

* cited by examiner

TECHNIQUE FOR UTILITY NETWORK MANAGEMENT

TECHNICAL FIELD

The present disclosure relates to analyzing, visualizing and acting on performance data relating to utility networks.

BACKGROUND

Utility network management has become a challenging task in view of the increasing complexity of utility networks. Exemplary complex utility networks that need to be managed are electricity, gas, cold water supply, hot water supply (e.g. through geothermal energy or solar collectors) and waste water.

With the widespread introduction of smart metering, a big data approach to utility network monitoring and control becomes possible. A smart meter is an electronic device that is able to communicate via a wireless or wired computer network to deliver real time and/or on demand data on consumption to a control entity at the utility company. Typically, a smart meter will "read" the meter, i.e. record the meter reading, at regular intervals, e.g. hourly or half-hourly, and report the readings at least daily back to the utility company for monitoring and billing.

For example, in the United Kingdom, smart metering is being installed nationwide to all homes for electricity and the aim is to complete the task by the end of 2020, with at the time of writing around five million smart meters already having been installed. In the case of smart metering of electricity, the term smart grid is used, since 'grid' is a synonym for network in electricity supply.

FIG. 8 is a schematic block diagram of an electricity network incorporating smart grid aspects. Renewable electricity generators in the form of a wind turbine and a solar panel are illustrated schematically together with sensors which enable measurement data to be sent via a mobile telephone network to an operation center where central computer facilities are available to perform analytics. Consumption is also monitored by smart meters whose measurement data is also sent via a suitable communication path, e.g., the mobile telephone network, a fixed line network, or power-line communication to the operation center. Consumption is shown schematically be electric cars being charged and domestic meters.

The smart meter consumption data is illustrated as being aggregated in a clustering algorithm on its way to the operation center. Further relevant data is supplied to the operation center in the form of meteorological information, i.e. weather information. The meteorological information may comprise current weather readings taken by appropriate sensors, e.g. for wind, rain, atmospheric pressure etc. The meteorological information may also comprise weather forecast data, e.g. from a national weather center. In the operation center analytics are applied to all the received data, and this analytics can be represented visually to domain experts in the operation center overlaid on a map of the relevant town, district, region etc. In the illustration, we show that the analytics has made a prediction regarding consumption at one local area and generation in another local area.

It is known to analyze supply and demand data in an electricity network in order to understand the spatial and temporal dynamics within the network. The supply and demand data can then be used to switch on and off electricity generator stations, such as gas or hydroelectric power stations, that have a low latency, in order to smooth out fluctuations in demand, e.g. owing to a major national event being shown on TV, and supply, e.g. from environmental electricity generators such as wind and solar.

For analysis, at one extreme, expert domain knowledge can be hard-coded into fixed algorithms with fixed parameter settings. At the other extreme, fully automatic, data-driven algorithms with machine learning can be used to analyze the supply and demand data.

Experts have gained a deep understanding of the processes involved from experience, so that for example an expert is able to detect early signs of a forthcoming network overload from the supply and demand data. This is useful, since appropriate actions can be undertaken to switch in additional generators or to remove generators, thereby to avoid the predicted undersupply or oversupply to the grid.

A natural hierarchy exists in smart grid systems. Smart meters monitor household or building level data. Data collectors aggregate their measurements on a sub-station level that represents a geographic unit with specific needs. The quality of the electricity service depends on the voltage level, and has to be assured at all times by delicate balance between demand and response, i.e., the grid cannot be overloaded, and demands need to be met exactly.

Unfortunately, power generation is not as flexible as the consumption fluctuations, and renewable energy supply fluctuates independent of demand fluctuation. This creates an optimization problem, since there is no efficient large-scale electricity storage technology available. An electricity company therefore has the special problem, compared with other utilities, that not just undersupply, but also oversupply is highly undesirable, since electricity storage capacity is not present to any significant degree in the grid.

Analysis to find the cause of network undersupply or oversupply is a complex task, even for a subject matter expert. The reason why this is a difficult problem is that patterns relating to supply and demand can overlap each other and it is difficult to extract an exact timing sequence of events which is characteristic of a given kind of network activity. Moreover, the data set being analyzed may be incomplete. For example, some data may have been lost, or, in the case of real-time monitoring, the event may still be unfolding.

Ultimately, the results of such analysis need to be included in a reporting system for automated actions, alerts and real-time feed-back for decision makers or various end-users. The goal of the utility company is not only acknowledgment of events occurring in the system but also searching for new patterns that can provide new algorithmic solutions or trigger singular actions. As new domains of analytics see new, more sophisticated ways of detecting events, new ways of presenting results become useful so that utility company employees without deep expert knowledge can make appropriate decisions, or those decisions can be fully automated.

Hence, where a complex system can be perturbed by events originating in a very basic level, root-cause analysis can become helpful. The new complexity levels and granularity of measurement feeds also present advantages for performance visualization where event patterns determine performance instead of single property of events.

In particular, the task of electricity network monitoring is expected to become more and more complex over time, as both the supply and consumption of electricity becomes ever more distributed. Local power generation through community projects and domestic installations is distributing power generation. Moreover, the overall mix of electricity generation is becoming more complicated as traditional large-scale nuclear and coal fired power stations are decommissioned and are replaced with much smaller solar and wind generators whose power generation is subject to the weather. On the consumption side, the widespread adoption of electric vehicles, and specifically the need to charge their batteries, presents a major distribution in the overall pattern of power consumption, since much higher power consumption will take place in residential districts.

SUMMARY

There is a need for a visualization technique that enables a better utility network management.

According to a first aspect of the disclosure there is provided a computer-automated method for analyzing performance data for a utility network that supplies a commodity to a consumer. The method comprises receiving a data set containing a log of a first time sequence of utility network events occurring in the utility network in which each utility network event is associated with at least one utility network location and has been classified into one of a plurality of event types including at least one relating to consumption of the commodity. The method further comprises creating a second time sequence from the first time sequence by aggregating the events into event groups, wherein each event group is defined as a plurality of events which are in a specific sequence of event types, each event group being classified into one of a plurality of event group types. Still further, the method comprises creating a third time sequence from the second time sequence by aggregating the event groups into event super-groups, wherein each event super-group is defined as a plurality of event groups which are in a specific sequence of event group types, each event super-group being classified into one of a plurality of event super-group types. The method also comprises rendering into a visualization at least one of the time sequences such that in the visualization each of said types is visually distinct from other types in the same time sequence.

According to a second aspect of the disclosure there is provided a computer system for analyzing utility network performance data. The system comprises a data input operable to receive a data set containing a log of a first time sequence of utility network events occurring in the utility network in which each utility network event is associated with at least one utility network location and has been classified into one of a plurality of event types including at least one relating to consumption of the commodity. The system further comprises a memory operable to store the data set and a processor operable to analyze the data set through the actions of:
(i) creating a second time sequence from the first time sequence by aggregating the events into event groups, wherein each event group is defined as a plurality of events which are in a specific sequence of event types, each event group being classified into one of a plurality of event group types;
(ii) creating a third time sequence from the second time sequence by aggregating the event groups into event super-groups, wherein each event super-group is defined as a plurality of event groups which are in a specific sequence of event group types, each event super-group being classified into one of a plurality of event super-group types; and
(iii) rendering into a visualization at least one of the time sequences such that in the visualization each of said types is visually distinct from other types in the same time sequence.

The system also comprises an output operable to output the visualization to a display.

According to a third aspect of the disclosure there is provided a computer network for analyzing utility network performance data, the network comprising: a computer system according to the second aspect; a plurality of metering devices located at consumer locations and operable to measure consumption of the commodity by the consumer as meter readings and/or a plurality of sensor devices located at respective commodity generator locations and operable to measure supply of the commodity to the network as sensor readings; and a plurality of network telecommunication links via which the meter readings and/or sensor readings are transmitted to the computer system to form at least a part of said data set.

Data relating to events belonging to the or each commodity consumption event type can be collected as a meter reading taken by a metering device located at a consumer location, e.g. a smart meter, which is operable to measure consumption of the commodity by the consumer, e.g. to take an electricity meter reading, gas meter reading, water meter reading etc. That part of the data set relating to such a commodity consumption event type, i.e. those meter readings, is received over a communications path, such as a telecommunications network or data transmission over power lines, which may be a fixed or ad hoc network or a combination thereof, and which may take place over wired or wireless links or a combination thereof.

At least one of the event types may relate to utility network events that are relevant for supply of the commodity, so that there are event types specific to both supply and consumption. This combination is useful for electricity networks, where it is important to balance power generation with power consumption in order to maintain the network voltage within a specified variation. This combination is also useful for water and gas supply networks, where it is important to balance water or gas input, e.g. from water or gas reservoirs, with water or gas consumption in order to maintain the network pressure with a specified variation. Data relating to events belonging to a commodity supply event type can be collected as a sensor reading taken by a sensor device located at a commodity generator location, e.g. a flow meter at the output of a water or gas reservoir or a power meter at the output of an electricity generator. The sensor device is thus operable to measure supply of the commodity to the network. That part of the data set relating to such a commodity supply event type is received over a communications path, typically the same or a communications path, e.g. a shared fixed line or mobile telephone network, over which the commodity consumption event type data is received.

Through the multi-level hierarchical analysis, comprising three or more levels, and through the visualization, the hierarchy of events becomes intuitively visibly trackable to a domain expert who is able to recognize basic, mid and top-level patterns of the data in the visualization. The method and computer system can take advantage of complex levels and granularity of measurement feeds, since network performance is visualized in terms of event patterns rather than individual events. Events can be visualized which come from a single source stream, or from several parallel streams (e.g. several buildings in a neighborhood, or several wind turbines in a wind farm).

Network problems can be recognized because the multi-level hierarchical analysis combined with the visualization allows expert's brains to recognize missing information elements and variance of delays between individual events. Specifically a domain expert is able to interpret the visualization of the mid and top-level time sequences, even of incomplete data sets, to separate out patterns relating to different respective problems which overlap, which then allows an exact timing sequence of event types to be recognized as being characteristic of a given kind of network problem. Experts can feed this information to machine learning (ML) functionalities to extend automatic problem detection features of the network operation system. One embodiment included shows an event analytics solution for network monitoring of an electricity grid with load timelines visualized on local, regional and full network levels.

In particular, the analysis can uncover relationships between events and performance indicators. Events may be daily activities, such as particular types of use of electricity or particular types of generation of electricity, or particular types of use of water. Performance indicators may be water pressure (with a pressure meter) in a water or gas supply system, voltage level (with a voltmeter) in an electricity supply network, or temperature (with a thermometer) or heat (with a bolometer) in a hot water supply system. The relationships that the analysis is capable of revealing may be ones that are already known to domain experts, and also new ones previously unknown to domain experts. An example use case of the proposed system includes the identification of local voltage fluctuations in the grid within a sub-station's area that are monitored to identify if they spread to adjacent sub-stations. Another use case is to maintain electricity grid stability by monitoring for all possible events that could perturb the dynamics of the electricity grid.

It will be appreciated that fourth and further higher order time sequences can be created in the same way as the recited second time sequence is created from the first time sequence, and the third time sequence is created from the second. That is an nth order time sequence can be created from an (n−1)th order time sequence by aggregating and classifying, so that the analysis levels can be built up ad infinitum to any desired level. Specifically, the method or computer system may further comprise creating at least one higher order, nth time sequence from the previous highest order, (n−1)th time sequence by aggregating the groups of the previous highest order, referred to as sub-ordinate groups, into supra-ordinate groups, wherein each supra-ordinate group is defined as a plurality of sub-ordinate groups which are in a specific sequence of sub-ordinate group types, each supra-ordinate group being classified into one of a plurality of event supra-ordinate group types.

The proposed method and system can also be integrated into existing monitoring methods and systems extended with streamed data processed by real-time analytics for visual monitoring of events. Specifically, the proposed method and system can be integrated into existing smart grid monitoring and control systems, such as a head-end-system, SCADA (Supervisory Control and Data Acquisition), for integrating data collectors of sub-station data. The proposed method and system may also employ cloud-based measurement platforms. Spatially distributed systems inherently are compatible with common data analytics solutions, for which a unified view and comparative studies can be created from merged data sets.

The network events may each be specific to one or more particular network entities. An example utility consuming entity is a residential or office building or a factory or chemical plant. An example utility supplying entity is an electricity generator such as a solar panel, or solar farm, a wind turbine or wind turbine farm, a tidal energy generator, a gas power station, or a combined heat and power generator from geothermal energy. The network location(s) associated with each event may be the physical location of the participating entities, so may include the location of energy consuming entities, energy supplying entities and intermediate grid entities and paths, such as sub-stations, transformers, storage facilities and so forth.

An event is defined or characterized by a specific pattern being present in the measured or deduced timeline of the monitored system. This definition applies at each hierarchical analysis level. An event may be any event defined by the method or system for collection into the data set, in particular events known or thought to have relevance for network performance. An event may be defined by an expert, or be defined automatically as part of the present or a previous analysis.

A simple event might be a type of consumption or supply, e.g. charging of electric vehicles, or generation of wind energy. A more complex event may be a peak in electricity consumption or supply for a particular class of entity, for example a peak in electricity consumption in office buildings, or a peak in wind power generation, or a peak in domestic cold water use for gardens.

In some embodiments, the visualization includes a map representation of events in relation to their network locations and according to at least one of the second time sequence and the third time sequence.

In some embodiments the analysis further comprises recognizing a pattern in the data set by matching the current event groups and/or super-groups to a first time period of at least one stored data set in which the same event groups and/or super-groups are present. In this way, it can be predicted how events may develop with reference to a second time period of the matched stored data set or sets, wherein the second time period follows the first time period. In particular, future network loading can be predicted based on warping, i.e. applying a warp transform to, the first time period of the at least one stored data set onto the current data set and using the warped second time period of the at least one stored data set as the prediction.

For example, if there is a weather warning of a storm or a train strike in London, the network supply and consumption can be monitored in real-time, and historical data can be analyzed, to assess how the electricity demand levels are likely to be affected. With a medium-level storm during the day for example it may be that domestic electricity demand will increase as office workers do not travel to work, but stay at home. However, for a major-level storm it may be that there are mass evacuations, so the both domestic and commercial electricity demand drops significantly. Moreover, for a storm it is likely that wind turbine capacity will need to be switched off. For a strike of railway workers in London, then again, demand will shift away from office locations to home locations with a severity depending on which group of workers is striking and by which railway company.

The visualization may include a map representation of the predicted future utility network loading. This map representation of the prediction may be integrated in or separate from a map representation of the data set being analyzed.

The map representation(s), i.e. the map representation of the analyzed data set or the prediction, may encode time with one of: color or shading in a single image frame; or such that separate image frames relate to specific times or periods of time which can be displayed in time order.

The map representation(s) may be to scale of a real geographical map, or may be a schematic representation of a network diagram, such as the electricity grid, showing nodes or entities of the network and their interconnections and/or juxtaposition.

In some embodiments, user actuatable controls may be provided for modifying the map representation to filter in and out based on at least one of event types, event group types, and event super-group types. User actuatable controls may also be provided for the visualization of at least one of the first time sequences, the second time sequence and the third time sequence to filter in and out based on at least one of event types, event group types, and event super-group types respectively.

Changing the visualizations, including the map representation by adjusting the settings of the user actuatable controls may also be used to predict future network loading. Namely, predicting future network loading can be based on applying said user actuatable controls to filter out at least some of the events contained in the data set. A modified version of the data set can then be saved, with the events which have been filtered out from the visualization being removed, i.e. not saved, so that the saved events are those that have been selected by the user actuatable controls and the filters they represent.

The predicted future utility network loading can be used to provision additional resource on the network in order to mitigate the possibility of overloading. Namely, the predicted future utility network loading can be compared to existing network capacity to predict if any capacity shortfalls are likely to occur. If they are, then action can be taken automatically or by manual intervention to provision additional network capacity to address any such capacity shortfalls before they are predicted to occur.

The network location can be a geographical location and/or an association with a network entity in a network diagram.

The event group types can be pre-defined, or defined as part of the analysis, or a combination of both. When defined as part of the analysis, the event group types can be defined as part of creating the second time sequence from the first time sequence and according to the first time sequence.

The event super-group types may also either be pre-defined or defined as part of the analysis, or a combination of both. When defined as part of the analysis, the event super-group types can be defined as part of creating the third time sequence from the second time sequence and according to the second time sequence.

In the visualization, the different types in each time series should be represented in a way in which a user can easily distinguish between them. Namely, in each time series each type is ascribed a different visual characteristic for the visualization, for example a different color picked from a color chart. Moreover, in some embodiments, each event is ascribed a value of a quality parameter, which may be a continuously variable scalar parameter which can adopt a value within a particular range. The quality parameter is represented in the visualization such that the range of the parameter values is represented by a range of values of a visualization parameter. For example, if different colors are used to distinguish different types, then color saturation could be used as the visualization parameter. Alternatively, luminosity or brightness could be used according to the HSL (Hue, Saturation, Lightness) or HSB (Hue, Saturation, Brightness) color representations respectively. Another alternative would be to use opacity as the visualization parameter. The visualization can be performed by a custom graphical user interface (GUI) which receives the time series which processes the time series data to present images in a timeline which have any one or more of the following attributes: real-time, animated, searchable, zoomable in and out in time and/or space, contain icons for elements that are linked to a particular location, contain alert messages.

Using the method and computer system as described, the kinds of occurrences that can be monitored and analyzed are for example: morning/evening rush hour on a work day/Saturday/Sunday, lunch period on a work day/Saturday/Sunday, public transport strike event, extreme weather event.

According to a further aspect of the disclosure there is provided a computer program stored on a computer readable medium and loadable into the internal memory of a computer, comprising software code portions, when said program is run on a computer, for performing the above-described methods. A computer program product may also be provided for storing the computer program.

BRIEF DESCRIPTION OF THE DRAWINGS

The embodiments of the present disclosure presented herein are described herein below with reference to the accompanying drawings.

DETAILED DESCRIPTION

In the following description, for purposes of explanation and not limitation, specific details are set forth (such as particular method steps) in order to provide a thorough understanding of the technique presented herein. It will be apparent to one skilled in the art that the present technique may be practiced in other embodiments that depart from these specific details. For example, while the following embodiments will be described with reference to an electricity network, it will be appreciated that the technique presented herein is not limited to data collected from any type of utility network.

Those skilled in the art will further appreciate that the services, functions and steps explained herein may be implemented using software functioning in conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described in the context of methods and systems, the technique presented herein may also be embodied in a computer program product as well as in a system comprising a computer processor and a memory coupled to the processor, wherein the memory is encoded with one or more programs that execute the services, functions and steps disclosed herein.

Memory may comprise any known computer-readable storage medium, which is described below. In one implementation, cache memory elements of memory provide temporary storage of at least some program code (e.g., program code) in order to reduce the number of times code needs to be retrieved from bulk storage while instructions of the program code are carried out. Moreover, similar to CPU, memory may reside at a single physical location, comprising one or more types of data storage, or be distributed across a plurality of physical systems in various forms.

The proposed computer system is able to operate as a standalone entity taking a data set as input, i.e. the raw network measurements, and presenting its analysis as a visualization on a display that is part of the computer system and/or outputting the rendered data in a format suitable presenting the visualization on an external display. In a standalone implementation, the computer system will include one or more of the following features: a data collection interface for inputting the data; data integration functionalities for domain-specific parameters; and a graphical user interface possibly having different implementation variants for different display devices. The details of these additions are well known to a person skilled in the art.

The proposed computer system is also suitable to be integrated into an existing reporting and analytics computer system.

Figure 1:
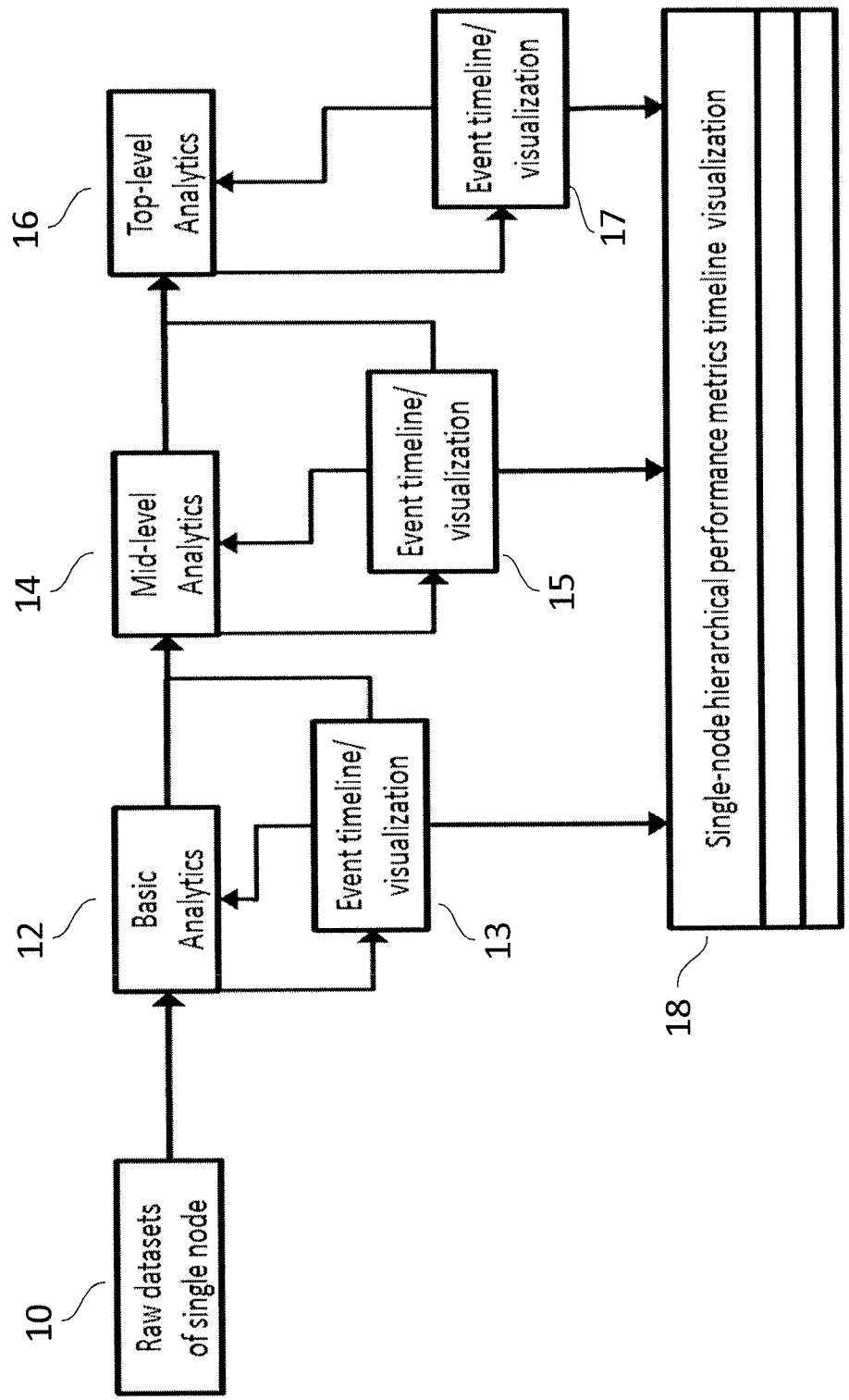
FIG. 1 shows a multi-level hierarchical analytics and visualization method and system as envisaged by embodiments of the disclosure.

FIG. 1 shows a multi-level implementation of hierarchical analytics and visualization method and system as envisaged by embodiments of the disclosure. In the illustrated example, there are three analytics levels, but it will be appreciated from the following that four, five, six or more analytic levels could be provided following the teachings provided.

In input module 10 receives a number of raw data sets, one from each node, which collectively constitute an input data set 10 for analysis. The input data set contains, for each of a plurality of network entities, a log of a first time sequence of events. (A time sequence of events may be referred to as a timeline elsewhere in this document.) Each network event is logged such that it is associated with one or more network locations, e.g. by being associated with a network entity such as a home or building.

Basic analytics are applied by a basic analytics module 12 to classify the events into one of a plurality of event types. The basic events timeline is rendered in a basic-level visualization module 13 by the method into a visualization which may be displayed to a user via a graphical user interface.

Mid-level analytics are then applied by a mid-level analytics module 14 which has the role of creating a second time sequence from the first time sequence obtained from the basis analytics by aggregating the network events into event groups. Each event group is defined as a plurality of events which are in a specific sequence of event types. Each event group is classified into one of a plurality of event group types. The mid-level analytics may employ a pattern recognition algorithm such that the event groups are created when predefined patterns are recognized complemented by links between events. The mid-level events timeline is rendered by a mid-level visualization module 15 into a visualization which may be displayed to a user via a graphical user interface.

Top-level analytics are then applied by a top-level analytics module 16 which has the role of creating a third time sequence from the second time sequence by aggregating the event groups into higher level event groups, which we refer to as super-groups to distinguish them from the mid-level analytics groups and to reflect the fact that they are supra-ordinate to the mid-level groups. Each event super-group is defined as a plurality of event groups which are in a specific sequence of event group types.

Moreover, each event super-group is classified into one of a plurality of event super-group types. The top-level analytics may employ a pattern recognition algorithm such that the event super-groups are created when predefined patterns are recognized. The top-level events timeline is rendered by a top-level visualization module 17 into a visualization which may be displayed to a user via a graphical user interface.

Each of the three timelines are co-rendered by a multi-level visualization module 18 which combines the outputs of the individual visualization modules 13, 15, 17 so that the three levels of timeline are presented alongside each other in a single visualization of all three analytics levels, so that their juxtaposition allows for direct visual comparison by a domain expert user. In addition, to facilitate the visual interpretation at each analytics level, the rendering of the basic, mid and top-level events is done in such a way that within each visualization level the different types are visually distinct from each other. The visualizations may create the timelines with events being color-coded (i.e. hue) by look up to a customizable color chart, and a quality measure being coded within each color by another color parameter (saturation or brightness in HSB, or saturation or luminosity in HSL). Alternatively, the quality measure value could be coded by opacity. The visualization may allow user customization, for example: a real-time sliding window view in which the user can set the time window to be visualized; zooming in or out in time after the session has finished; and enabling predefined time-warping techniques in which event types deemed to have higher importance are highlighted by extra horizontal (i.e. time axis) extension.

For systems whose performance is influenced by a high number of factors, it is useful to categorize, and then visualize, which different basic-level and mid-level activities can lead to a common top-level result. Categorization of these factors can be based on linear methods, such as principal component analysis (PCA), or non-linear methods, such as autoencoders. The categorization divides the abstract space of the factors by functionally interpretable partitions. By limiting the number of possible explanations and valid links between observed events through this categorization, the resulting mid-level relations can be filtered to identify the possible root causes of the high-level result.

We propose the following visualizations: expert-defined relations and alerts view; relations and correlations uncovered by the ML modules; and mixed view for comparing the various explanations of the same top-level result. For efficient graphical user interface representation of the above (raw events and relations), measures can be taken when designing the layout and graphic elements including: color choice, dynamic transparency, fading, blinking, icons, hover overs and layout.

Any of the basic, mid and top-level analytics may use automatic classification to classify the events, event groups and event super-groups respectively, wherein the automatic classification may use pattern recognition as described in any of the following publications, the entire contents of which are incorporated herein by reference:

S. Grauwin, S. Sobolevsky, S. Moritz, I. Godor, C. Ratti—Towards a comparative science of cities: using mobile traffic records in New York, London and Hong Kong, Computational Approaches for Urban Environments, Springer, pages 363-387 (2015)

D. Kondor, P. Thebault, S. Grauwin, I. Godor, S. Moritz, S. Sobolevsky, C. Ratti—A Tale of Many Cities—Visualizing Signatures of Human Activity in Cities Across the Globe, Landscape Architecture Frontiers, vol 3/3, pages 54-61, June 2015

I. Gódor, Z. Kallus, D. Kondor, S. Grauwin, S. Sobolevsky—The Signatures of City Life, Ericsson Mobility Report, pages 28-29, November 2014

I. Gódor, P. Jonsson, Z. Kallus, D. Kondor—The Digital Signatures of Sport, Ericsson Mobility Report, pages 20-23, June 2015

The analysis is thus performed in a hierarchical manner to give three levels of network performance evaluation, by feeding the output time series as input for mid-level pattern detection and feeding the mid-level output as input for top-level pattern detection.

These three analytic levels can be interpreted as follows. The basic level represents the raw physical measurable data with high granularity originating from, for example, domestic or office buildings, or from elements of the smart grid, such as power generators, power storage elements, power distribution elements etc. The basic level data can originate from data collection and SCADA systems, from consumer-related information sources (e.g. real-time location of individual customers from smartphone GPS data, smart home sensors), from weather measurement and forecast data. On the other hand, the top-level represents the events accumulated from the whole grid. In contrast, the mid-level represents an aggregated information, e.g. for a sub-station area. This is important from management point of view, since the sub-station level events are geographically limited and the SCADA system is able to control them separately from each other.

The three resulting timelines are displayed together in a hierarchical diagram, e.g. a cake diagram. The pattern detection algorithm applied at the mid and top-levels can be trained by experts and/or by applying machine learning to historic datasets.

We now further discuss the three levels of the hierarchical event analytics and visualization.

The first event analytics level is constituted by the events that have been logged in the network which may be actual events, i.e. raw network data, or pre-processed network data, e.g. the events may be peaks in particular actual events. We refer to these as basic events which form a basic timeline, e.g. from a single network node, being formed by events identified in the raw measurement stream or streams that have been collected for analysis. For example, the basic events may be a specific type of network event as seen on consumption measurements in a home in the network or supply measurements relevant to a generator.

The second event analytics level is constituted by specific basic event patterns which are each formed by specific combinations of types of basic events (from the first level). Each specific combination of basic event types may be termed a mid-level event type.

The third event analytics level is constituted by specific mid-level event type patterns, i.e. specific combinations of mid-level event types, which may be termed top-level event types.

The raw measurements may come from a single stream or multiple streams which are combined into the first hierarchical event analytics level. Since the analytics levels and the multi-stream network data are functionally orthogonal to each other, we refer to the levels of the hierarchical event analytics as vertical levels and the tiers of combination of the network data (if present) as horizontal levels.

We introduce the combination of timelines in three horizontal levels as follows:

A simple mapping is creating event hierarchy using only a single node timeline.

A unified mapping is creating event hierarchy using the merged timelines of two or more nodes. This union is achieved by using the time ordering or matching of patterns and can be created on the basic or mid-level timelines.

A differential mapping is creating an event hierarchy where relative performance of two nodes or groups of nodes—e.g., local vs regional averages—for comparative study. Matching of patterns before differentiation can be useful to look for event-related performance, and simple time ordering to look for session-level performance comparison.

In summary, FIG. 1 shows the single-node timeline functions corresponding to the hierarchical event analytics and visualization method on three vertical levels. Basic analytics in module 12 is performed on the raw data received from module 10. The output from the basic analytics module 12 is provided to the basic-level visualization module 13 and to the mid-level analytics module 14. Similarly, the output from the mid-level analytics module 14 is provided as input for mid-level visualization module 15 and the top-level analytics module 16. The three levels together serve to form the 3-level hierarchical visualization of a given node's (or group of nodes) performance timeline. Each created event timeline can serve as the basis of new pattern definition. New definitions can, in return, improve the respective analytics logic.

Mapping will enable an event timeline to be constructed. On each level, events are characterized by basic parameters defining event type (e.g., one type may be a sudden electricity load variation) and event quality (e.g., quality may be derived from parameters extracted from a characteristic timeline for that type of event and the area affected.) Type and quality can be represented visually in a number of ways, such as with color and intensity respectively. With a suitable visualization, an expert can evaluate performance and also detect any unfamiliar event patterns. A single node can be characterized based on summarized event quality over the timeline of a session. Differential mapping against historic timelines can highlight trends in performance. A system of nodes can be characterized by using unified and/or differential maps where mid- and top-level quality measures can be based on simple or relative requirements.

For example, one local grid performance parameter could be the voltage fluctuation level at a single home or building. These voltage fluctuations will arise from changes in local electricity consumption and/or local electricity supply, from which the basic events can be defined.

Figure 2:
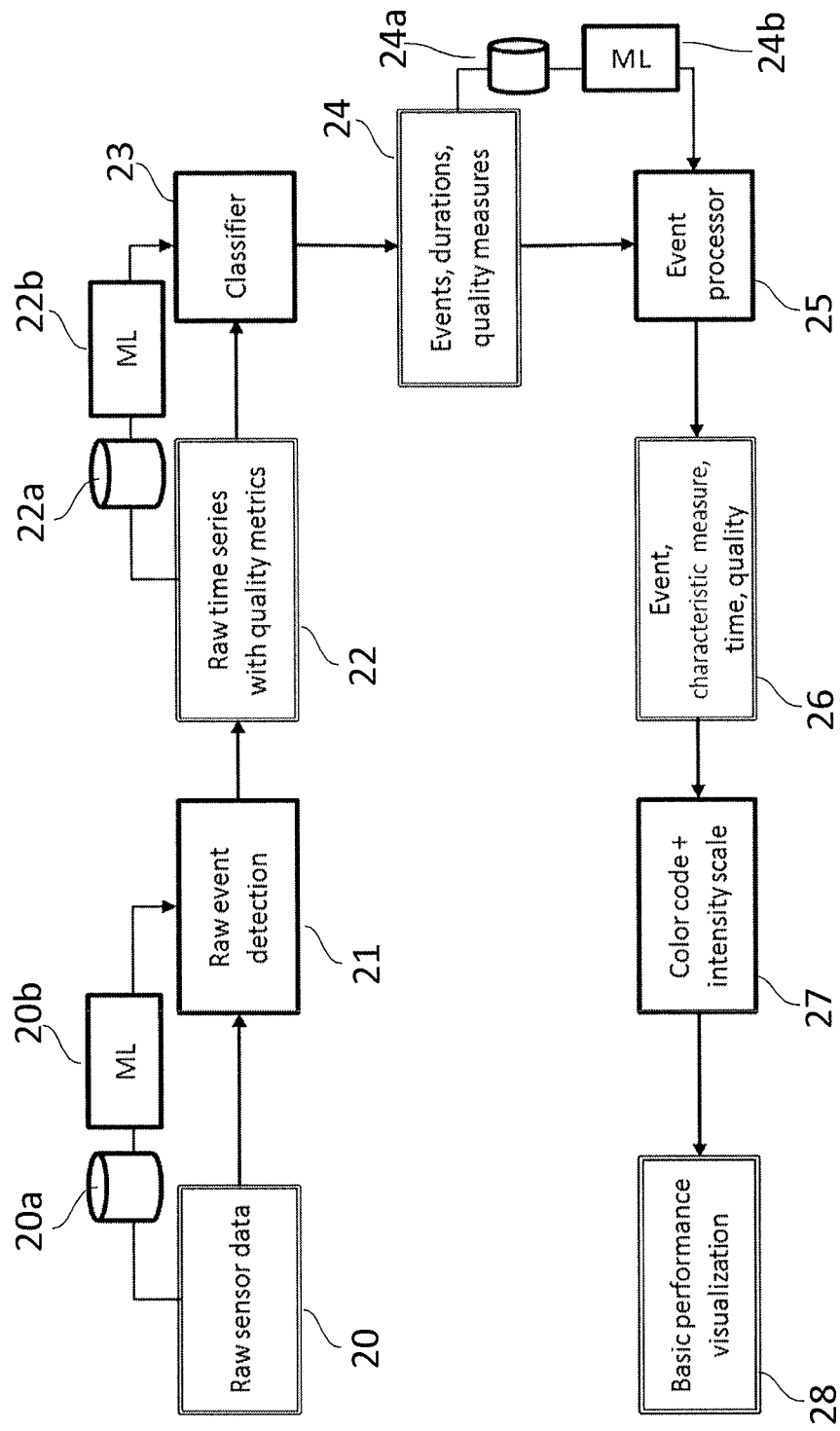
FIG. 2 shows aspects of the method and system of FIG. 1 in more detail.

FIG. 2 shows the workflow of the basic analytics module of FIG. 1 in more detail. Each box labeled "ML" is a machine learning (ML) algorithm module which applied its ML algorithm, based on pattern recognition, to the input data received as input to that analysis level. Each of the storage icons shows a reference database which at each hierarchical level has the role of hosting a reference database referenced by the ML algorithm during processing the data, and also of providing storage for the input data to that level and the output from the ML algorithm.

Time-stamped raw sensor data 20 from the network is received at a first analysis level and stored in a reference database 20a. With reference to the reference database 20a a ML module 20b processes the raw sensor data by using pattern recognition to detect raw events in the raw sensor data and produce a time series of raw events. The processed data is output to a raw event detection module 21.

Each raw event in the raw events time series is then transmitted to a quality metric addition module 22 and stored in a reference database 22a. With reference to the reference database 22a, a ML module 22b processes the raw event detection data to deduce one or more quality metrics from each event, or at least those events deemed to be significant for the particular analysis being performed (so-called use case). A quality metric is a discretely or continuously variable quantity that is a measure of goodness for performance. The quality metrics are then associated with the relevant raw event from which they have been derived.

The processed data comprising the raw events with their quality metrics are then supplied to an event classifier module 23 which applies pattern recognition to classify each event into one of a plurality of event types based on a performance quality measure. The classifier module 23 can be pre-configured with pre-defined event types or generate event types on the fly based on analyzing the raw event data and optionally also their associated quality metrics.

The event classifier outputs the time series, now appended with event classifications, to a duration measurement module 24 and stored in a reference database 24a. With reference to the reference database 24a, a ML module 24b processes the time series and event classifications so as to associate each event with a time span, i.e. duration. The processed data is output to an event processor module 25.

The event processor module 25 has the role of processing the time series data and associated data output from the multi-level analysis performed by the preceding stages in order to produce a characteristic measure (i.e. score) and performance quality indicators from the data (e.g. voltage fluctuations which are a measure of service quality of an electricity supply). Namely, the event processor module 25 processes the multi-level analysis data from the preceding stages to add a performance quality measure to each event that is to be kept as a relevant event for the particular performance use case of interest. This performance quality is the final assessment of the characteristic measure (or score), i.e. it is characteristic of an event which has meaning in the context of the use case and also a time dependency.

In a visualization preset applicator 27 the events are color-coded, or otherwise visually tagged, according to event type. The events are additionally visually tagged according to the value of a quality measure by saturation or luminosity/brightness of the event-type color, or some other suitable visual tagging which is distinct from, and preferably complementary to, the event type visual tagging. Another alternative would be to use opacity as the visualization parameter.

This completes the pre-processing of the basic network data which can then be rendered into a visualization in a basic data time series visualization module 28 whose role it is to render the results of the event processing in a performance visualization, for example in real-time. The events with various scores at given times and associated time-dependent performance quality measures are parameters that the visualization module 28 can use for generating the visualization though suitable coloring, icon choice and so forth to generate the final GUI.

To interpret the visualization, the user, that is the person or persons tasked with evaluation and decision making based on their interpretation of the visualization, e.g. in a live system, need to know the performance quality measure(s) that are being rendered, but do not need any knowledge of how the analysis is performed in detail in order to be able to understand the visualization, e.g. to identify the root cause behind a current network problem, or to predict a future network problem, though the visualized timelines of events and their scores at the various levels.

In the above-described multi-level analysis, definition of event types may be pre-defined by an expert, or defined on-the-fly by the ML algorithm, or any combination of the two at any given analysis level. The proposed approach therefore permits a duality at each step of expert vs machine learning for definition of event types based on previously observed or expected patterns. The same point can also be made for the performance quality measures, i.e. they can be defined by experts in the field, or as part of the ML. At one extreme of this spectrum, the whole process can be pre-programmed by field experts using pre-defined event types, event quality measures and ultimately the resulting performance measure of the monitored system (calculated from events of various levels at specific times/places: put into context of the use case). At the other extreme, the implementation can heavily rely on automation where machine learning will find and define specific events and at most minimal settings of learning parameters are set by experts. In this latter case of ML-based detection, the learning can be performed on historic datasets and the learnt information can be used to fix the parameters that are used to process real-time data streams. Alternatively, the learning could be done in real-time on the real-time data streams, so that the analysis stages user real-time ML algorithms that learn and detect on the incoming data stream in parallel and continuously. The system can then improve its event detection and classification, and also define new event types, as more measured data is presented. With either approach, with any given definition of event types, the analysis has the task of identifying, i.e. detecting events, in the incoming data stream, e.g. in real-time, of the system being monitored. Further the analysis will compare the incoming data to, for example, a baseline, or predefined thresholds of quality measures, which are relevant in the system being monitored, where this analysis may take account of location and time when assigning a characteristic quality measure to each detected event. The events are then filtered based on the quality measure, so that events that are deemed to be relevant are tagged as such, since these will be the events that are taken forward by the process for visualization. Events filtered out may be retained despite their tagging as non-relevant, or may be deleted, or at least not passed on to the next processing stage. The quality measure is used as a score for placing the event on a quality scale that is to be used for performance evaluation of an expert via the visualization.

The workflow of FIG. 2 thus performs a number of tasks in series to create, from an input time series, a performance visualization timeline. These tasks can be summarized in order to be: pattern detection in time series of basic events identifying time and type of complex events in the raw data from the network; performance metric calculation of found complex events including event classification; and visualization according to timing, type and performance metrics.

Outlier recognition by a domain expert is facilitated by the visualization tool with its customization options. Furthermore, automated higher-level analytical tasks, such as prediction, prevention, or outlier detection can be performed using machine learning techniques on historical higher-level timelines of many nodes with similar functions.

Smart grid operation centers are sites where the analysis of hierarchical events can reveal a complex network problem. The root cause analysis of such problems is a hard task even for domain experts, because patterns relating to different problems can overlap each other and each occurrence of an event of a given type will typically be different in respect of timing, intensity and other factors. It is therefore not generally possible to define in advance the exact timeline of the unfolding of an event or sequence of events that might give rise to a network problem. Moreover, the sequence events might be incomplete, for example some events might not be logged for some reason, such as a breakdown in smart metering, or be lost in transmission to the operation center. However, such situations can be recognized by an expert's brain when presented with the proposed forms of multi-level analytics visualization, since the human brain is powerful at, for example, filling in missing information and recognizing common patters in a time line even when the time intervals between events on the time line are not exactly the same from occurrence to occurrence. It is therefore possible to identify a much more complete set of mid-level problems through the aid of the multi-level visualization. Moreover, experts can feed the information to ML functionalities to extend automatic problem detection over a wider area of the network than that visualized.

Smart grid analysis can be organized in multiple levels. For the sake of simplicity, here we define as the basic hierarchy level the events coming from a single dwelling (e.g. house or apartment with its own utility metering), various types of residential and non-residential buildings (residential tower, office building, warehouse building, factory building, school building, etc.) in the network. As more advanced technology becomes available for domestic buildings, the single node concept can be replaced by the nano-grid concept, where detailed measurements are introduced for both power consumption and generation, and these locally controlled systems form the smart grid. Examples of basic events are very diverse and may include: electricity, gas or water consumption, voltage quality measures, regional or local weather information, etc.

Mid-level events can be defined either as combination of basic events forming particular pattern, or information measured at a higher aggregation level, such as substations of the power grid, where events of neighboring nodes determine together the statistical quantities at the substation level. For example, strictly local information cannot decide the control of local solar panels, but input of surplus energy to the grid is only possible within the permitted regional load balancing limits. Another example is the spreading of an error, e.g. through a cascading failure mechanism, that can be identified both in temporal and spatial dimensions at higher hierarchical levels. Such errors may include: a) topological errors even on physical or logical level, b) saturation of the network, or c) errors at domestic residential properties.

Figure 3:
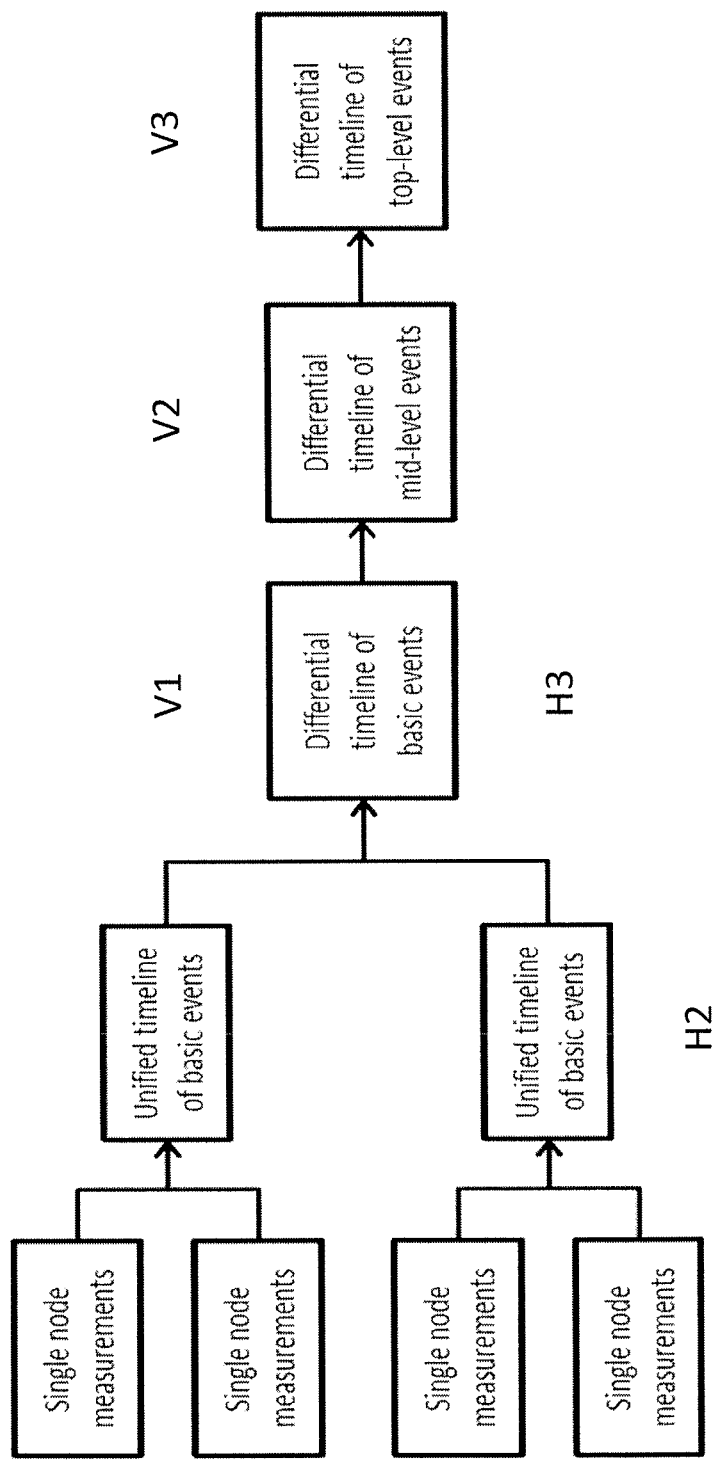
FIG. 3 shows an example of event types and data feeds with three vertical levels and three horizontal levels.

FIG. 3 shows an example of event types and data feeds with three vertical levels V1, V2, V3 and three horizontal levels H1, H2, H3 noting that the combined basic event data is both the top horizontal level H3 and the bottom vertical level V1. The horizontal level H1 could for example be single node measurements from individual homes in a given neighborhood, where the consumption data from each home is unified, so that in horizontal level H2 there is a unified timeline for each neighborhood. The unified timelines of the basic events could then be processed to generate horizontal level H3 by differentiation to find peaks in the basic event activity. This peak data is then the data input to the hierarchical analysis, i.e. data set H3 is data set V1. A similar approach to that just described by way of example for consumption could also be used for supply. For example, the individual wind turbines of a wind farm could be the H1 level, and the wind farm aggregating its wind turbines the H2 level.

On each level events are characterized by basic parameters defining event type (e.g., a sudden network load variation which causes neighborhood adjustments) and event quality (e.g., characteristic timeline and area affected). The events, event groups and event super-groups are visualized in different colors through look up to a color coding chart and the quality measure by another color parameter or opacity as described above according to a scale defined by a preset. By a preset we mean a definition which maps a range of values of the quality measure to a range of values of the parameter used to visualize the quality measure, where the mapping may be linear or non-linear. The visualization is suitable to allow domain experts to make a performance evaluation, and also to recognize when new patterns occur.

A single node can be characterized based on summarized event quality over a linear timeline of a session. Differential mapping of the current timelines against stored historic timelines (or summaries thereof) can highlight trends in current performance.

A system of nodes can be analyzed by using unified mappings (i.e. mid-level) and/or differential mappings (i.e. top-level) where mid and top-level quality measures can be based on simple or relative requirements.

The basic 'horizontal' hierarchy level is the events coming from single nodes of the network. The mid-level groups events from related nodes, which may for example be: different homes of the same neighborhood, or the area covered by an electricity sub-station or a particular town, or an aggregation of large shopping malls in different geographical areas. That is, the spreading of an error can be identified both in temporal and spatial dimensions at the different 'horizontal' hierarchical levels. Examples of such errors are: a) topological errors even on physical or logical level, b) saturation of the network (which may be as detected in the user plane and/or the control plane), and c) user-specific errors which occur repetitively, e.g., in a given region of the network or in given time periods of the day, etc.

Definitions of new mid and top-level event groups and super-groups can be performed by the domain expert without any data engineering knowledge as the visual tool facilitates intuitive understanding by inspection. In addition, new groups and super-groups can be automatically proposed by self-learning pattern recognition algorithms to give a powerful combination of machine learning and domain expert knowledge. This in return facilitates the continuous updating of rule engines using the defined events for automating actions.

Outlier recognition by domain experts is similarly highly facilitated by the visual tool and its customization options. Furthermore, automated higher-level analytical tasks, such as prediction, prevention, or outlier detection can be performed using machine learning techniques on historical mid or top-level timelines of nodes with similar functions.

Figure 4:
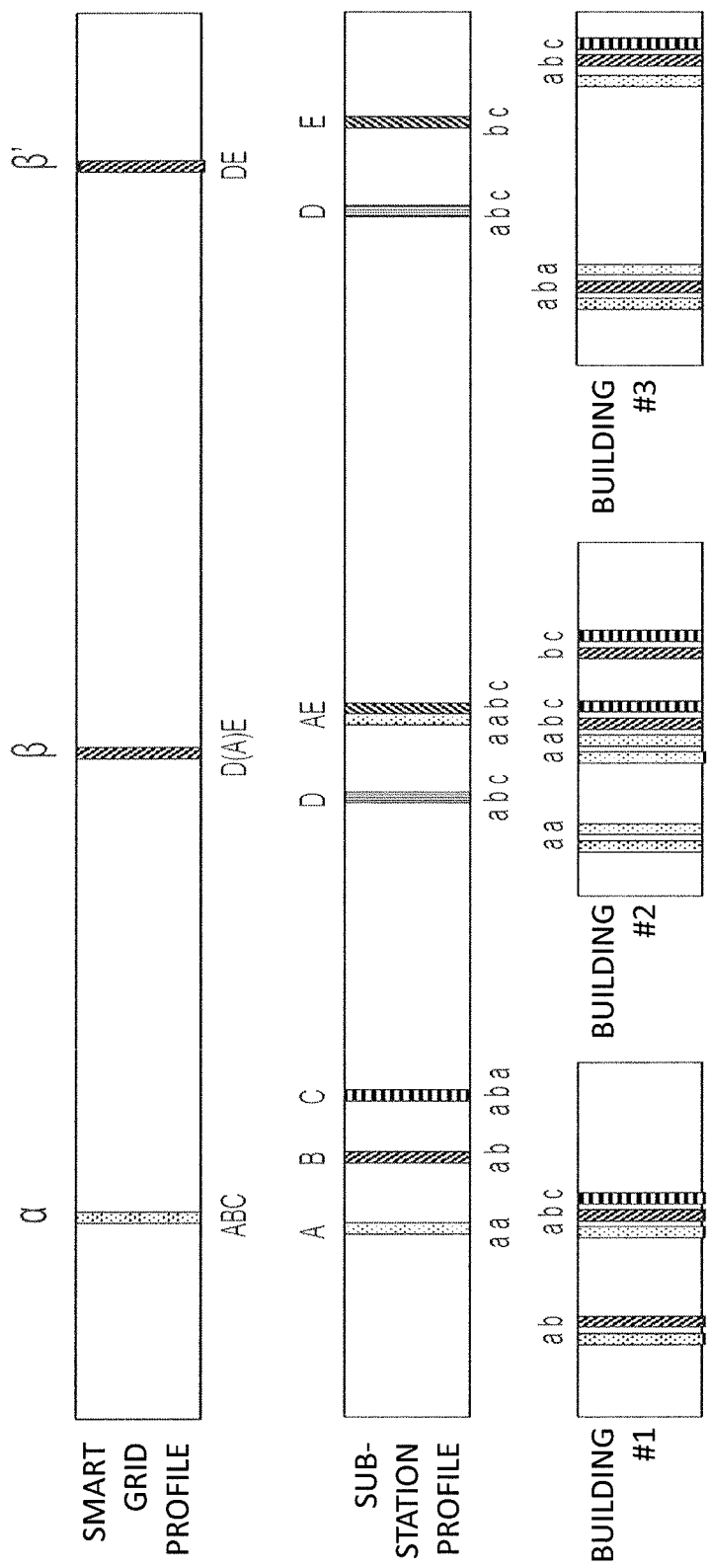
FIG. 4 shows a spatio-temporal hierarchical visualization of a multi-level network load variation analysis.

FIG. 4 shows a smart grid example of spatiotemporal hierarchical visual analysis illustrating network load variation. We note that this illustration is an oversimplification in order to show the principles and has three analysis levels. In other embodiments, four or more analysis levels could be provided. With reference to FIG. 4, we now describe a specific embodiment which shows electricity consumption analytics for network operation monitoring. The time evolution of network loading is visualized with timelines at three levels: local (one building), sub-regional (all buildings supplied by a particular electricity sub-station) and regional (a defined geographical area such as a town or city or other area defined by an administrative boundary such as a county or district).

A key objective for an electricity utility company is to keep a balance between supply and demand, so that these match closely at all times. As power generation is becoming increasingly distributed (e.g., with local generators using renewable energy sources) this balancing task is becoming increasingly difficult. When there is a mismatch between supply and demand the mains voltage level will fluctuate. One quality of service indicator for electricity providers is the guarantee to keep voltage fluctuation to within certain specified limits. If this is not achieved, since electrical equipment is mostly sensitive to big voltage changes, too much deviation will at some point result in outages that could cascade over the whole network. Hence, one typical performance metric can be based on network voltage level. The network events explaining the changes in the network-level performance are local node consumption events on the basic level and unified timelines spatially aggregated for geographical regions which are supplied from specific sub-stations on the mid-level.

Level 1: On a basic event level, one can imagine how different the daily profile could depend on the activity type in a given area (like school districts, office districts or residential areas) and the weather through its effect on environmental energy generation by wind turbines and solar panels and collectors. In the following particular example, the components of electricity consumption come from:
 a—generation fluctuations arising from solar power generation
 b—consumption fluctuations coming from offices and factories
 c—consumption fluctuations coming from homes Level 2: However, how basic events are reflected in the sub-station load, when the load variation can be considered as normal or typical, is completely hidden without the hierarchical analysis. In the particular example, the components of the sub-station load come from:
 A—sunshine (seen in the morning and at noon)
 B—mix #1 of sunshine and office hours (seen in the morning)
 C—mix #2 of sunshine and office hours (seen in the morning)
 D—mix of all types (seen at noon and in the afternoon)
 E—mix of office hours and home use, e.g. cooking (seen at noon and in the evening)

Level 3: In the above artificial example, one can notice that there are only two major types of load intensity variations directly connected to the behavior of different regions and sub-stations in them. In the particular example, the components of regional load come from:
 α—morning pattern (mix of A, B and C)
 β—noon pattern (mix of D, A and E)
 β'—afternoon/evening pattern (mix of D and E)

Based on that, a domain expert at the electricity utility company can understand what the impact would be, if one of the elementary patterns were changed and how the changed pattern would propagate through the hierarchy of the network system.

Once similar connections have been recognized by experts, network monitoring systems can learn what the normal behavior of the network is, when supply from different generators should be increased and decreased to react to external supply (e.g. the weather) and demand (e.g. special events such as public holidays or major national events such as an election day). For example, on a summer day when clouds dissolve gradually, there will be a simultaneous increase both in consumption, owing to increased activity of air conditioning (A/C) machines, and in supply, owing to solar energy generators, thus leading to a general increase in the loading of the electricity grid.

Since an event in the context of the present method and system is a specific pattern in the measured or deduced timeline of the monitored system, it will be appreciated that the entities associated with an event will display certain patterns, and so can be classified at different analysis levels into "events".

Having described various embodiments of the disclosure, it will be understood that the proposed computer system and method relates to processing utility network supply and/or consumption data to generate performance analytics visualizations. It can be used to visualize a series of events identified during a session. It is suitable for various domains where performance is related to ordering and timing of specific event configurations, and pattern recognition is useful for evaluation of performance. Variations and hierarchical pattern formation, differential and unifying views are also proposed. Using input from real-time data streams, the proposed visualizations make it easy to derive insights and recognize complex patterns at a glance. In particular, the proposed visualizations are suitable for users who are experts of the underlying utility network, and thus have expensive domain knowledge, but who are not necessarily experts either in analytics or the reporting system which collected the network data. At least some parts of utility networks are commonly very old, for example in the electrical power grid, and in the water supply and waste water systems. Consequently, digitalization is likely to create a need for software tools that allow experts to connect with specialist knowledge and analysis possibilities.

The multi-level pattern embedded in the proposed visualization can enable a domain expert to make an intuitive visual evaluation of performance during a session. The timelines of different network entities, such as electricity generator elements or electricity consuming buildings, can be presented alongside each other in a single view to allow for direct visual comparison. The visualization facilitates detection of trends, patterns, or anomalies in a series of events which in turn may facilitate improvement of existing rule engines. The proposed visualizations are also adaptable to any domain where a series of events reoccurs in a dynamical manner, e.g. morning or evening cooking periods, office hours, or weather patterns that influence solar or wind generation, or tidal information that affects tidal energy generation. The proposed analysis is usable as part of a real-time reporting system to monitor how events are unfolding, as well being useable for analyzing historical data sets.

The proposed implementations can easily be integrated into cloud-based measurement platforms. Spatially distributed systems inherently need common data analytics solutions where unified view and comparative studies can be created of merged datasets.

Figure 5:
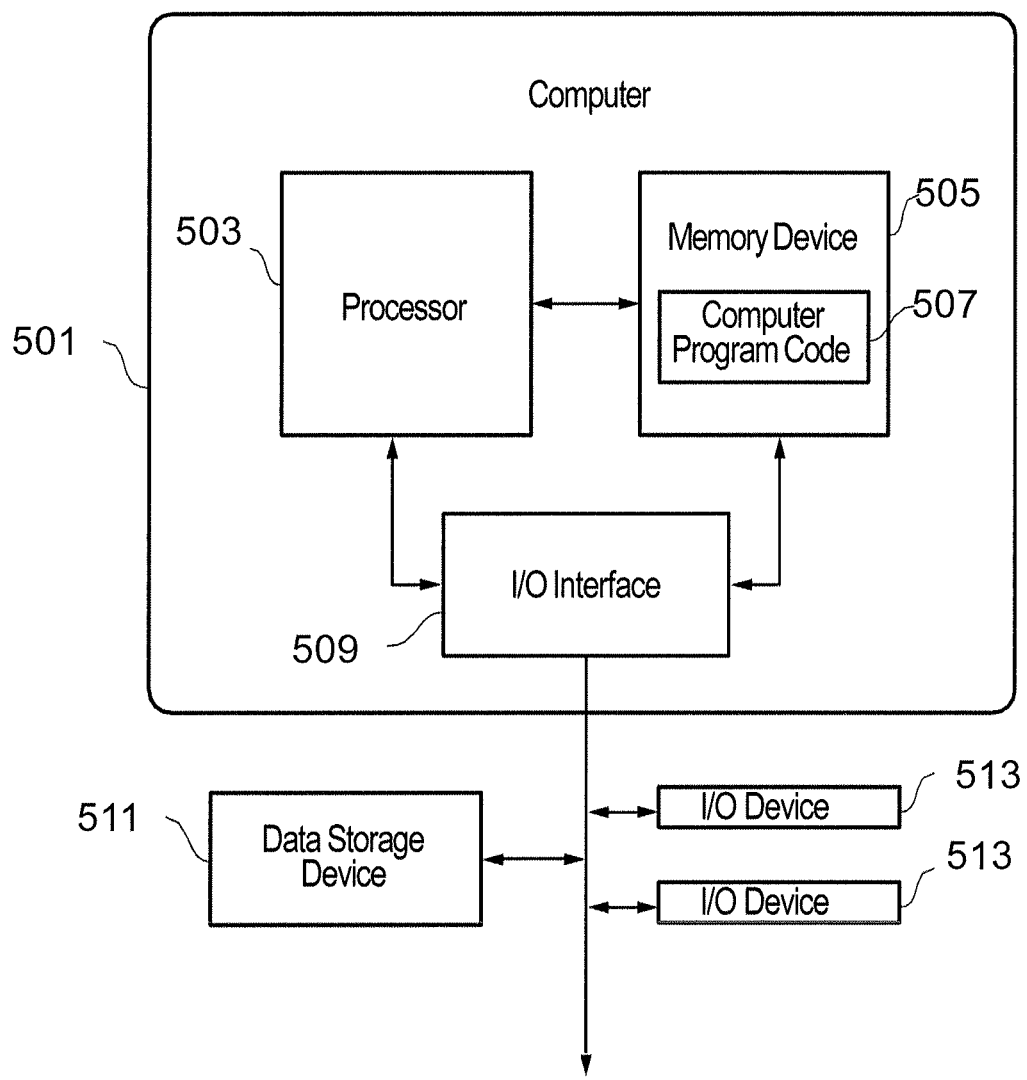
FIG. 5 shows a structure of a computer system and computer program code that may be used to implement the disclosed methods.

FIG. 5 shows a structure of a computer system and computer program code that may be used to implement any of the disclosed methods.

In FIG. 5, computer system 501 comprises a processor 503 coupled through one or more I/O Interfaces 509 to one or more hardware data storage devices 511 and one or more I/O devices 513 and 515. Processor 503 may also be connected to one or more memory devices or memories 505. At least one memory device 505 contains stored computer program code 507, which is a computer program that comprises computer-executable instructions. The stored computer program code includes a program that implements the method and method aspects presented herein. The data storage devices 511 may store the computer program code 507. Computer program code 507 stored in the storage devices 511 is configured to be executed by processor 503 via the memory devices 505. Processor 503 executes the stored computer program code 507.

Memory 505 may comprise any known computer-readable storage medium, which is described below. In one implementation, cache memory elements of memory 505 provide temporary storage of at least some program code (e.g., program code 507) in order to reduce the number of times code needs to be retrieved from bulk storage while instructions of the program code are carried out. Moreover, similar to CPU 503, memory 505 may reside at a single physical location, comprising one or more types of data storage, or be distributed across a plurality of physical systems in various forms.

I/O interface 509 comprises any system for exchanging information to or from an external source. I/O devices 513, 515 comprise any known type of external device, including a display device (e.g., monitor), keyboard, etc. A bus provides a communication link between each of the components in computer system 501, and may comprise any type of transmission link, including electrical, optical, wireless, etc.

I/O interface 509 also allows computer system 501 to store information (e.g., data or program instructions such as program code 507) on and retrieve the information from computer data storage unit 511 or another computer data storage unit (not shown). Computer data storage unit 511 may comprise any known computer-readable storage medium. For example, computer data storage unit 511 may be a non-volatile data storage device, such as a semiconductor memory, a magnetic disk drive (i.e., hard disk drive) or an optical disc drive (e.g., a CD-ROM drive which receives a CD-ROM disk).

An implementation of the present disclosure may take the form of a computer program product embodied in one or more computer-readable storage medium(s) (e.g., memory 505 and/or computer data storage unit 511) having computer-readable program code (e.g., program code 507) embodied or stored thereon.

Program code (e.g., program code 507) embodied on a computer-readable medium may be transmitted using any appropriate medium, including but not limited to wireless, wireline, optical fiber cable, radio frequency (RF), etc., or any suitable combination of the foregoing.

Figure 6:
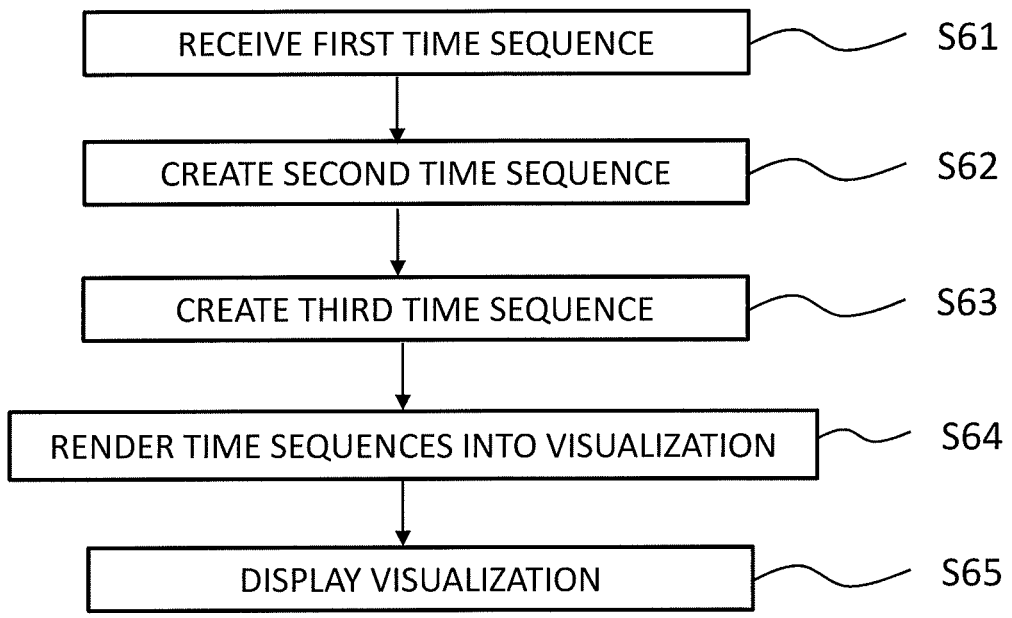
FIG. 6 is a flow diagram of an embodiment of a computer-automated method of an embodiment of the disclosure for analyzing network performance data.

FIG. 6 is a flow diagram of an embodiment of the above-described computer-automated method for analyzing network performance data.

In Step S61, there is received a data set containing a log of a first time sequence of network events in which each network event is associated with at least one network location and has been classified into one of a plurality of event types.

In Step S62, there is created a second time sequence from the first time sequence by aggregating the events into event groups, wherein each event group is defined as a plurality of events which are in a specific sequence of event types, each event group being classified into one of a plurality of event group types.

In Step S63, there is created a third time sequence from the second time sequence by aggregating the event groups into event super-groups, wherein each event super-group is defined as a plurality of event groups which are in a specific sequence of event group types, each event super-group being classified into one of a plurality of event super-group types.

In Step S64, there is rendered into a visualization some desired combination of the first time sequence, the second time sequence and the third time sequence such that in the visualization each of said types is visually distinct from other types in the same time sequence. If all combinations are rendered, then a desired combination can be picked out by a user when the visualization is displayed.

In Step S65, the visualization is displayed on a display.

Figure 7:
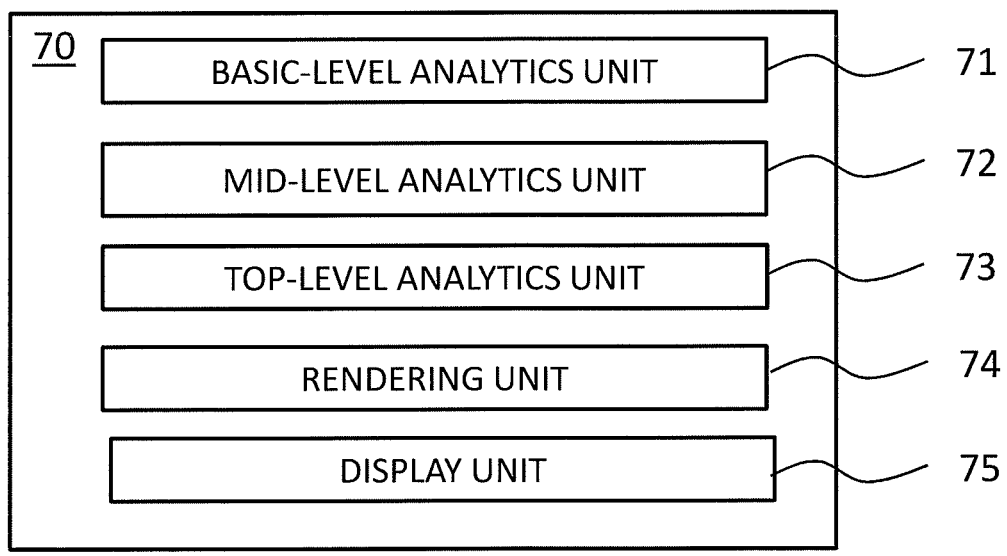
FIG. 7 is a block schematic diagram showing a computer system of an embodiment of the disclosure configured to analyze network performance data.
Figure 8:
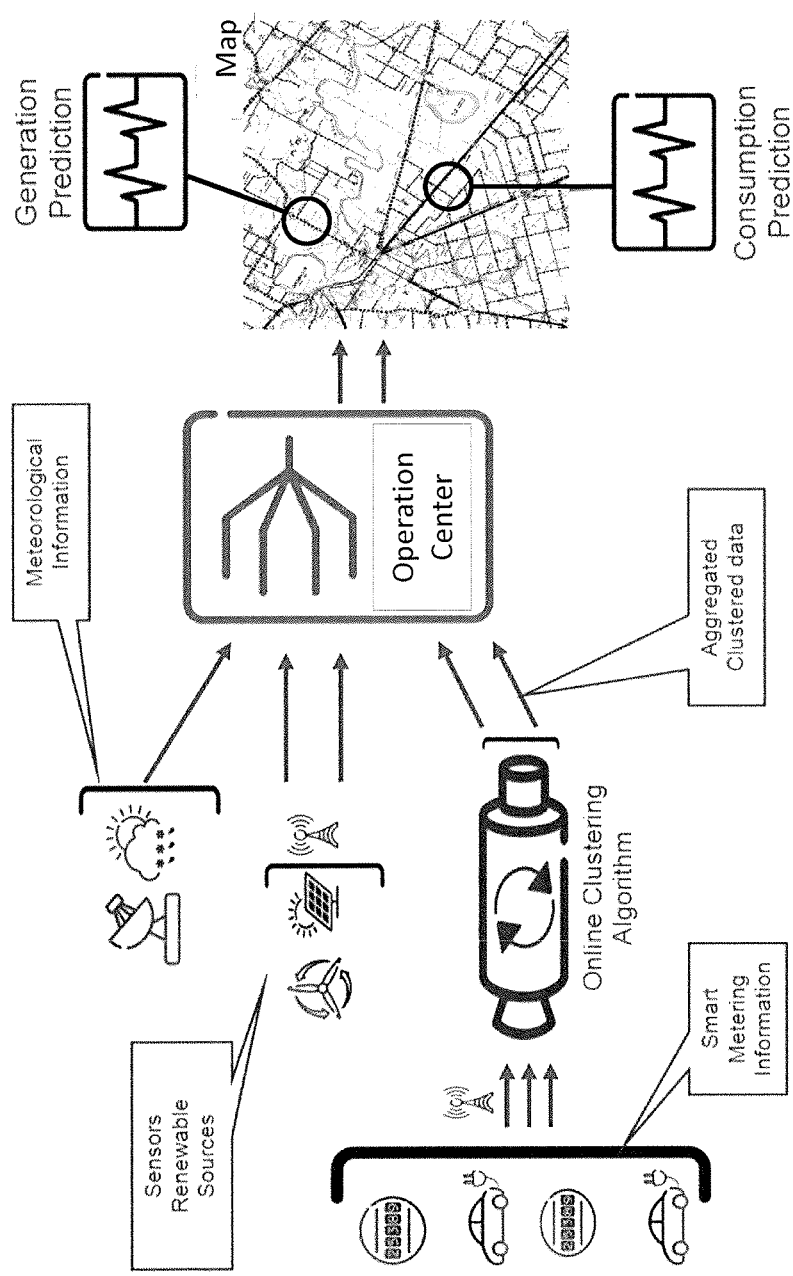
FIG. 8 is a schematic block diagram of an electricity network.

FIG. 7 is a block schematic diagram showing a computer system 70 of an embodiment of the disclosure configured to analyze network performance data.

A basic-level analytics unit 71 is configured to pre-process input network performance data to generate a data set containing a log of a first time sequence of network events in which each network event is associated with at least one network location and has been classified into one of a plurality of event types.

A mid-level analytics unit 72 is configured to create a second time sequence from the first time sequence by aggregating the events into event groups, wherein each event group is defined as a plurality of events which are in a specific sequence of event types, each event group being classified into one of a plurality of event group types.

A top-level analytics unit 73 is configured to create a third time sequence from the second time sequence by aggregating the event groups into event super-groups, wherein each event super-group is defined as a plurality of event groups which are in a specific sequence of event group types, each event super-group being classified into one of a plurality of event super-group types.

A rendering unit 74 is operable to render into a visualization a desired combination of the first time sequences, the second time sequence and the third time sequence such that in the visualization each of said types is visually distinct from other types in the same time sequence. If all combinations are rendered, then a desired combination can be picked out by a user when the visualization is displayed.

A display unit 75 is configured to receive the rendered visualization and display it for a user.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

The invention claimed is:

1. A method for analyzing performance data for a utility network that supplies a commodity to a consumer, the method comprising:
   receiving a data set containing a log of a first time sequence of utility network events occurring in the utility network in which each utility network event is associated with at least one utility network location and has been classified into one of a plurality of event types including at least one relating to consumption of the commodity;
   creating a second time sequence from the first time sequence by aggregating the events into event groups, wherein each event group is defined as a plurality of events which are in a specific sequence of event types, each event group being classified into one of a plurality of event group types;
   creating a third time sequence from the second time sequence by aggregating the event groups into event super-groups, wherein each event super-group is defined as a plurality of event groups which are in a specific sequence of event group types, each event super-group being classified into one of a plurality of event super-group types; and
   rendering into a visualization at least one of the time sequences such that in the visualization each of said types is visually distinct from other types in the same time sequence;
   wherein:
      data relating to events belonging to a commodity consumption event type are collected as meter readings taken by metering devices located at respective consumer locations and operable to measure consumption of the commodity by consumers, and wherein that part of the data set relating to the commodity consumption event type is received over a communications path;
      at least one of the event types relates to utility network events that are relevant for supply of the commodity; and
      data relating to events belonging to a commodity supply event type are collected as sensor readings taken by sensor devices located at respective commodity generator locations and operable to measure supply of the commodity to the network, and wherein that part of the data set relating to the commodity supply event type is received over the same communications path.

2. The method of claim 1, wherein the visualization includes a map representation in relation to the utility network locations and according to at least one of the second time sequence and the third time sequence.

3. The method of claim 1, further comprising:
   recognizing a pattern in the data set by matching at least one of the current event groups or super-groups to a first time period of at least one stored data set in which the same event groups and/or super-groups are present; and
   predicting future utility network loading based on warping the first time period of the at least one stored data set onto the current data set and using the warped second time period of the at least one stored data set as the prediction.

4. The method of claim 3, wherein the visualization includes a map representation of the predicted future utility network loading.

5. The method of claim 2, wherein the map representation encodes time with one of: color or shading in a single image frame; and such that separate image frames relate to specific times or periods of time which can be displayed in time order.

6. The method of claim 2, further comprising:
   modifying, using user actuatable controls, the map representation to filter in and out based on at least one of event types, event group types, and event super-group types.

7. The method of claim 1 further comprising:
   modifying, responsive to user actuatable controls, the visualization of at least one of: the first time sequence, the second time sequence, and the third time sequence to filter in and out based on at least one of event types, event group types, and event super-group types respectively.

8. The method of claim 6, further comprising:
   predicting future utility network loading based on applying said user actuatable controls to filter out at least some of the events contained in the data set; and
   saving a modified version of the data set with the events which have been filtered out from the visualization being removed.

9. The method of claim 3, further comprising:
   comparing the predicted future utility network loading to utility network capacity to predict any capacity shortfalls; and
   provisioning additional utility network capacity to address any such capacity shortfalls before they are predicted to occur.

10. The method of claim 1, wherein the location is at least one of: a geographical location and an association with a utility network entity in a utility network diagram.

11. The method of claim 1, wherein the event group types are pre-defined.

12. The method of claim 1, wherein the event group types are defined as part of creating the second time sequence from the first time sequence and according to the first time sequence.

13. The method of claim 1, wherein the event super-group types are pre-defined.

14. The method of claim 1, wherein the event super-group types are defined as part of creating the third time sequence from the second time sequence and according to the second time sequence.

15. The method of claim 1, wherein in each time series each type is ascribed a different visual characteristic for the visualization.

16. The method of claim 1, wherein each event is ascribed a value of a quality parameter, and wherein the visualization represents a range of the quality parameter values by a range of values of a visualization parameter.

17. The method of claim 1, further comprising:
   creating at least one higher order time sequence from the time sequence of a previous highest order by aggregating the groups of the previous highest order, referred to as sub-ordinate groups, into supra-ordinate groups, wherein each supra-ordinate group is defined as a plurality of sub-ordinate groups which are in a specific sequence of sub-ordinate group types, each supra-ordinate group being classified into one of a plurality of event supra-ordinate group types.

18. A computer system for analyzing utility network performance data for a utility network that supplies a commodity to a consumer, the system comprising:

a data input operable to receive a data set containing a log of a first time sequence of utility network events occurring in the utility network in which each utility network event is associated with at least one utility network location and has been classified into one of a plurality of event types including at least one relating to consumption of the commodity;

a memory operable to store the data set;

a processor operable to analyze the data set through the actions of:

(i) creating a second time sequence from the first time sequence by aggregating the events into event groups, wherein each event group is defined as a plurality of events which are in a specific sequence of event types, each event group being classified into one of a plurality of event group types;

(ii) creating a third time sequence from the second time sequence by aggregating the event groups into event super-groups, wherein each event super-group is defined as a plurality of event groups which are in a specific sequence of event group types, each event super-group being classified into one of a plurality of event super-group types; and (iii) rendering into a visualization at least one of the time sequences such that in the visualization each of said types is visually distinct from other types in the same time sequence; and an output operable to output the visualization to a display; wherein:

data relating to events belonging to a commodity consumption event type are collected as meter readings taken by metering devices located at respective consumer locations and operable to measure consumption of the commodity by the consumers, and wherein that part of the data set relating to the commodity consumption event type is received over a communications path;

at least one of the event types relates to utility network events that are relevant for supply of the commodity; and data relating to events belonging to a commodity supply event type are collected as sensor reading taken by sensor devices located at respective commodity generator locations and operable to measure supply of the commodity to the network, and wherein that part of the data set relating to the commodity supply event type is received over the same communications path.

* * * * *